United States Patent Office 2,834,710
Patented May 13, 1958

---

2,834,710

PANCREATIC DESOXYRIBONUCLEASE PENICILLIN COMPOSITION AND PROCESS OF PREPARATION

Werner Baumgarten, North Hills, and Reginald F. Johnson, Willow Grove, Pa., assignors to Merck & Co., Inc., Rahway, N. J., a corporation of New Jersey No Drawing. Application June 29, 1955
Serial No. 518,948

6 Claims. (Cl. 167—65)

This invention concerns a new composition of matter and a novel process for the preparation of the same which is a stable combination of pancreatic desoxyribonuclease and an antibiotic. The invention is particularly concerned with a stable combination of pancreatic desoxyribonuclease and penicillin.

It can be readily appreciated that the most useful and convenient form for putting up the composition of this invention is in powdered form. At the present time a separate vial of diluent is supplied with each vial of pancreatic desoxyribonuclease, which is presently on the market, and the veterinarian makes up the required solution as the occasion demands. If supplied as a solution, the risk of potency loss through instability of the enzyme is greatly increased especially at temperatures above 40° F. Pancreatic desoxyribonuclease is used extensively by veterinarians for enzymatic debridement of certain pathologic conditions in animals. This includes such diseases as chronic suppurative navel infections, abscesses, wounds, bovine mastitis, sinusitis and the like. Thus, a practicing veterinarian has the option, depending upon the type of wound and its location, of either infusing pancreatic desoxyribonuclease by means of a syringe into a body cavity or using a solution of pancreatic desoxyribonuclease as an irrigation. The latter use, of course, is usually associated with open wounds.

It has customarily been the practice to first debride the thick hard exudates surrounding animal wounds as well as the purulent exudates associated with bovine mastitis with pancreatic desoxyribonuclease and then either simultaneously or within a relatively short time thereafter give the animal an antibiotic, such as penicillin, so as to avoid or reduce the incidence of infection.

This is a rather involved and extended procedure. A veterinarian first must prepare a pancreatic desoxyribonuclease solution to debride the wound of as much purulent exudate as possible and then administer, as a separate operation, a quantity of penicillin.

Attempts to mix the dry powders of pancreatic desoxyribonuclease and penicillin and then reconstitute the mixed powder to liquid form with well-known diluents were not successful because incomplete solution of the dry mixture resulted. Conversely, the mixing of preformed solutions of penicillin and pancreatic desoxyribonuclease with well-known diluents resulted in the formation of a precipitate. Obviously, a practicing veterinarian could not accomplish his purpose with a mixture which would either not completely dissolve or which would form a precipitate before use.

Attempts were made to vary the concentration of pancreatic desoxyribonuclease with respect to penicillin and vice versa. This did not result in any improvement. Other diluents, non-injurious to animals and humans were tried to effect complete solution, extremely pure ingredients were prepared, temperature conditions were varied but satisfactory results were not forthcoming.

The novel process of the present invention was discovered quite accidentally and in a manner that was totally unobvious to the most skillful workers in the art. It was discovered that a solution of pancreatic desoxyribonuclease and a solution of penicillin must be mixed at a neutral pH. This was unobvious to skillful workers because it is a well-known fact that solutions of pancreatic desoxyribonuclease are extremely unstable at neutral pH and lose enzymatic activity rapidly.

The novel process of the present invention involves the preparation of a solution of pancreatic desoxyribonuclease, a solution of sodium or potassium, preferably potassium penicillin, combining these solutions, and subsequently freezing and lyophilizing the combined solutions to a dry powder.

The pancreatic desoxyribonuclease solution is prepared by dissolving previously lyophilized pancreatic desoxyribonuclease in distilled pyrogen-free water. The pH of this solution is about 3.0. This solution is then sterilized and is kept at about 3° C. until mixed with the sterile penicillin solution.

The penicillin solution is prepared by dissolving potassium or sodium, preferably potassium penicillin, in a 4% solution of sodium glycerophosphate containing a small amount of anhydrous calcium chloride. The pH of the sodium glycerophosphate solution is adjusted to 7.2 prior to the addition of the potassium penicillin. The resulting solution is sterilized and kept at 3° C.

The two solutions are then combined, filled into suitable containers, frozen and lyophilized. The combination step results in a solution having a pH of about 7. In other words, the effective action of the sodium glycerophosphate and calcium chloride is to provide a neutral solution and no precipitation of enzyme or loss of enzymatic activity occurs. Prior to this unobvious process of obtaining a neutral pH, all previous attempts of mixing penicillin solutions with pancreatic desoxyribonuclease solutions resulted in precipitation.

In addition, the presence of metallic ions, preferably calcium ions, maintains the continued stability of the dry product combination after lyophilization. There is no adequate explanation of this behavior of the calcium ion. If the calcium chloride were left out, the dry lyophilized powder would lose enzymatic activity quickly and the product combination would be useless.

Table I below shows a comparison of the stabilities of a pancreatic desoxyribonuclease-penicillin combination with a preparation of pancreatic desoxyribonuclease at 45° C.

TABLE I

*Comparison of the stabilities of a pancreatic desoxyribonuclease-penicillin combination with a preparation of pancreatic desoxyribonuclease incubated at 45° C.*

| Period Incubated | Percent Desoxyribonuclease Activity of two preparations accounted for after incubation at 45° C. (dry powders) | |
|---|---|---|
| | Pancreatic Desoxyribonuclease-Penicillin | Pancreatic Desoxyribonuclease Preparation |
| One week | 112 | 104 |
| One month | 98 | 110 |
| Three months | 112 | 63 |
| Six months | 98 | 60 |
| Nine months | 88 | 66 |

Thus, the practicing veterinarian now has at his disposal a product which, in one simple operation, provides enzymatic debridement of purulent exudates as well as the cure or prevention of bacterial infections. Each agent acts independently of the other to be sure, but heretofore it required separate operations to provide the same protection.

As will be hereinafter shown in the example the calcium chloride is added to the penicillin solution prior to sterilization of the penicillin solution because the passage of a solution containing calcium ions through the sterilizing pads pretreated with dilute sulfuric acid gives rise to the formation of insoluble calcium sulfate which impedes filtration. This is avoided by adding the calcium chloride to the penicillin solution. Upon mixing of the sterilized penicillin solution containing the calcium ions and the pancreatic desoxyribonuclease solution, the resulting sulfate ion concentration is below the solubility product concentration of calcium sulfate and no precipitation occurs.

The presence of sodium glycerophosphate in the penicillin solution does not allow the phosphate ion to combine with the calcium. Undoubtedly, there is some internal linkage of the sodium glycerophosphate molecule which denies the availability of the phosphate for other reactions.

Table II below shows the marked stability of the dry lyophilized penicillin-pancreatic desoxyribonuclease combination at various temperatures from 3° C. to 45° C. Inasmuch as lower temperatures are non-deleterious to stability only the temperatures likely to be encountered in actual practice are shown.

The following example is illustrative of the process of the present invention, but is not to be construed as limiting.

TABLE II

*Stability of desoxyribonuclease-penicillin combination incubated at various temperatures (dry powder)*

| Period incubated | Percent activity accounted for after storage at— | | | | | | | |
|---|---|---|---|---|---|---|---|---|
| | 3° C. | | Room Temperature | | 37° C. | | 45° C | |
| | Pancreatic desoxyribonuclease | Penicillin | Pancreatic desoxyribonuclease | Penicillin | Pancreatic desoxyribonuclease | Penicillin | Pancreatic desoxyribonuclease | Penicillin |
| One week | 104 | | 105 | | 117 | | 112 | |
| One month | 105 | 104 | 130 | 101 | 121 | 98 | 98 | 98 |
| Three months | 134 | 97 | 137 | 97 | 124 | 92 | 117 | 93 |
| Six months | 125 | 93 | 118 | 90 | 105 | 88 | 99 | 87 |
| Nine months | 109 | 96 | 105 | 94 | 90 | 93 | 88 | 85 |
| One year | 135 | 100 | 145 | 95 | 110 | 86 | 110 | 89 |

EXAMPLE I 5 g. of previously lyophilized dry pancreatic desoxyribonuclease (17,000 u./mg.), prepared as described in our pending patent application No. 451,975 entitled "Process for Preparing Pancreatic Desoxyribonuclease," is dissolved in 750 ml. of distilled pyrogen-free water at 3–10° C. with stirring and sterilized by passing the solution through a Horman filter. The Horman filter pad is pre-treated with 500 ml. of 0.0025 N sulfuric acid solution followed by 500 ml. of water. After complete passage of the pancreatic desoxyribonuclease solution through the filter pad, the pad is washed with 750 ml. of distilled pyrogen-free water. The combined filtrate and wash is stored at 3° C.

140 g. of potassium penicillin (1569 u./mg.) is dissolved in 750 ml. of a 4% sodium glycerophosphate solution previously adjusted to pH 7.2. One and a half grams of anhydrous calcium chloride is added to this solution and dissolved with gentle stirring. The resulting solution is sterilized by passing it through a Horman filter. Previously, the Horman filter pad is treated with 300 ml. of a 4% sodium glycerophosphate solution containing, in solution 2 mg. of anhydrous calcium chloride per ml. After complete passage of the penicillin solution, the pad is washed with 750 ml. of 4% sodium glycerophosphate solution. The combined filtrate and washing is kept at 3° C.

The pancreatic desoxyribonuclease solution and the potassium penicillin solution are mixed in the cold at 3–10° C. and aseptically dispensed into sterile 10 ml. vials, and plug-frozen at −50° F. (−46.2° C.) or lower for 12 hours. The frozen vials are loaded into lyophilization chambers, the shelves of which have been cooled to 35–40° F. by circulation of refrigerated water. When lyophilization has been initiated and a satisfactory vacuum established, the circulation of refrigerated water is discontinued. At the completion of the cycle the vapor valve of the chamber is closed and air is admitted through a desiccant and dry sterile filter arrangement. The containers are stoppered under vacuum. The yield of lyophilized powder containing potassium penicillin and pancreatic desoxyribonuclease is 192 g.

It is to be understood that the invention is not to be limited to the exact details of operation or formulation as described, as obvious modifications will be apparent to those skilled in the art, and the invention is therefore to be limited only by the scope of the appended claims.

We claim:

1. A dry stable lyophilized powder containing penicillin, pancreatic desoxyribonuclease, sodium glycerophosphate as a pH 7 buffer and as a stabilizer therefor calcium ions, which composition, when reconstituted with a diluent, results in a homogeneous solution maintaining maximum enzymatic and antibiotic activity.

2. The composition as claimed in claim 1 where the diluent is distilled water.

3. The composition as claimed in claim 1 where the diluent is saline solution.

4. The composition as claimed in claim 1 where the antibiotic is potassium penicillin.

5. The composition as claimed in claim 1 where the antibiotic is sodium penicillin.

6. The process of preparing a dry stable lyophilized powder of pancreatic desoxyribonuclease and penicillin which comprises: dissolving pancreatic desoxyribonuclease in distilled water, sterilizing the resulting solution, mixing the sterilized pancreatic desoxyribonuclease solution with a sterilized solution of sodium glycerophosphate containing penicillin and calcium chloride, lyophilization of the combined solution to give the stable dry pancreatic desoxyribonuclease-penicillin combination as a white powder.

References Cited in the file of this patent

UNITED STATES PATENTS

| | | |
|---|---|---|
| 2,477,171 | Bower | July 26, 1949 |
| 2,589,210 | McGinty | Mar. 18, 1952 |

OTHER REFERENCES

Armstrong: Lancet, December 9, 1950, pp. 739–742.

Flosdorf: "Freeze-Drying," Reinhold Pub. Co., N. Y., 1949, pp. 103–107 and 111.

Pratt: "Stabilization of Penicillin in Aqueous Solutions by Low Concentrations of Phosphates," Nature, February 15, 1947, pp. 233–235.

Herrell: "The Calcium Salt of Penicillin," Proc. Staff Mayo Clinic, September 8, 1943, pp. 313–319.

U. S. Disp., 24th ed., "Sodium Glycerophosphate," pp. 1075–1076.